Feb. 7, 1933.    W. L. HIGLEY    1,896,955
SWITCH
Filed July 28, 1931    5 Sheets-Sheet 2
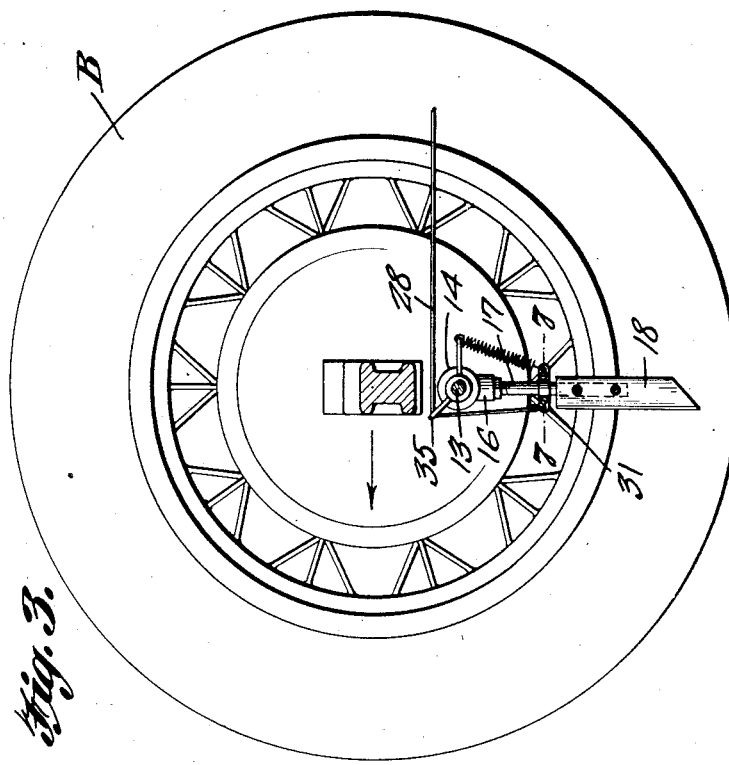
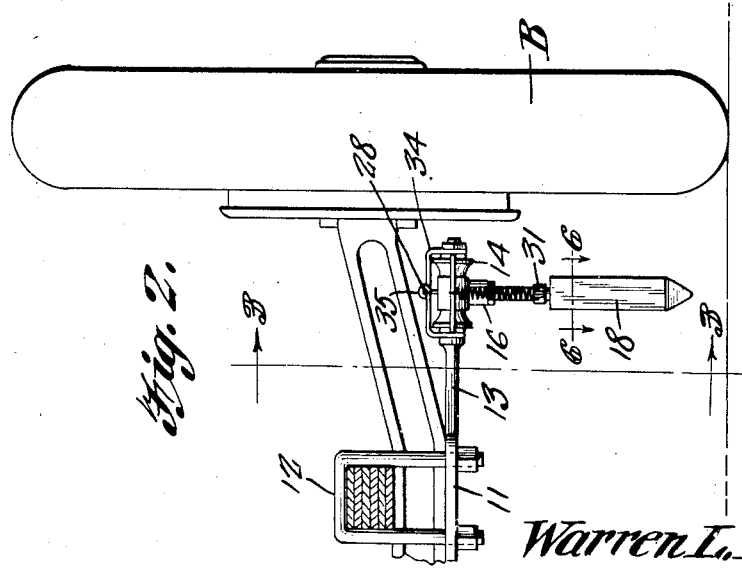
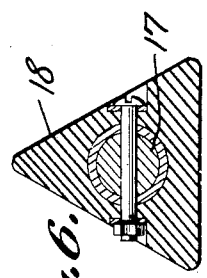

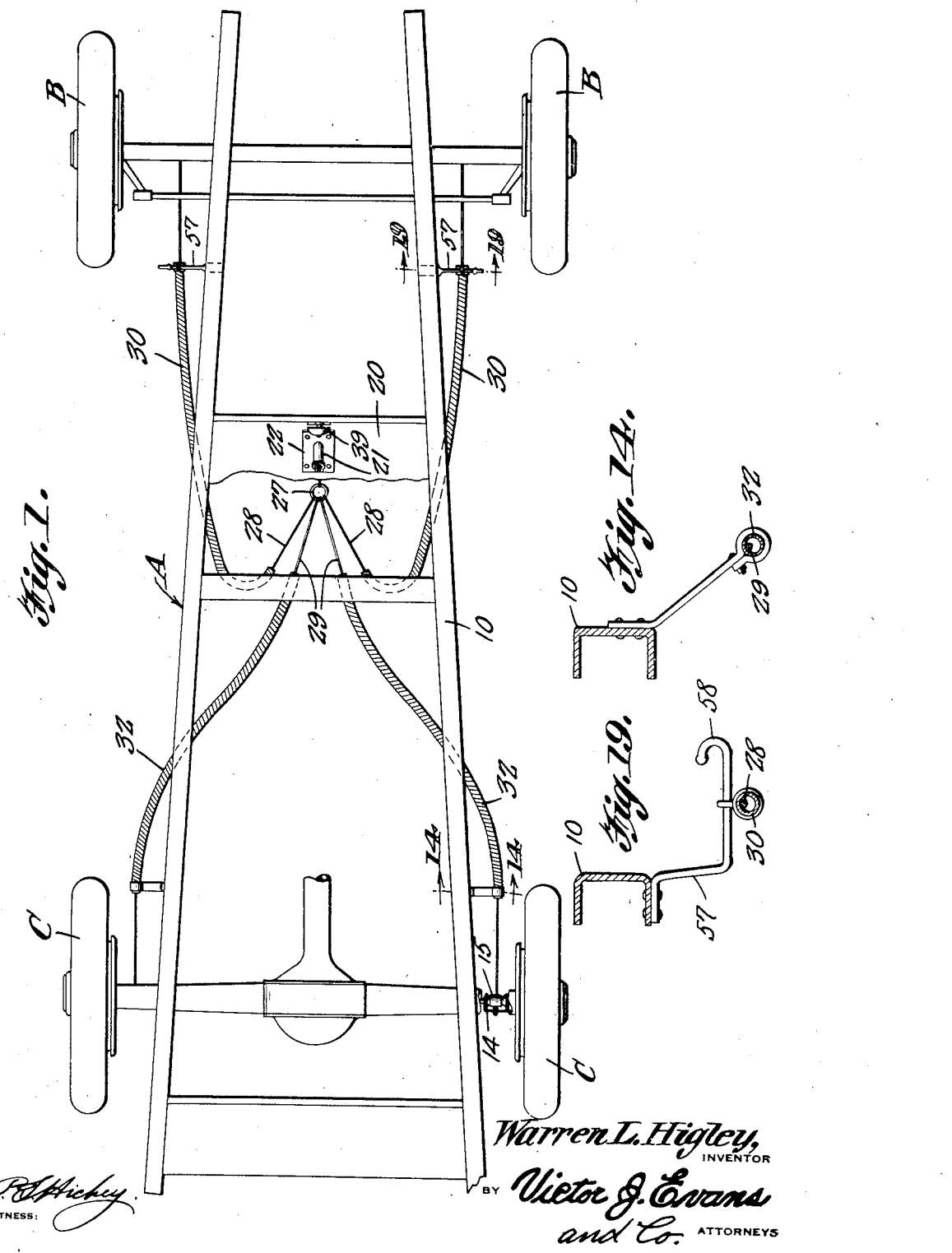

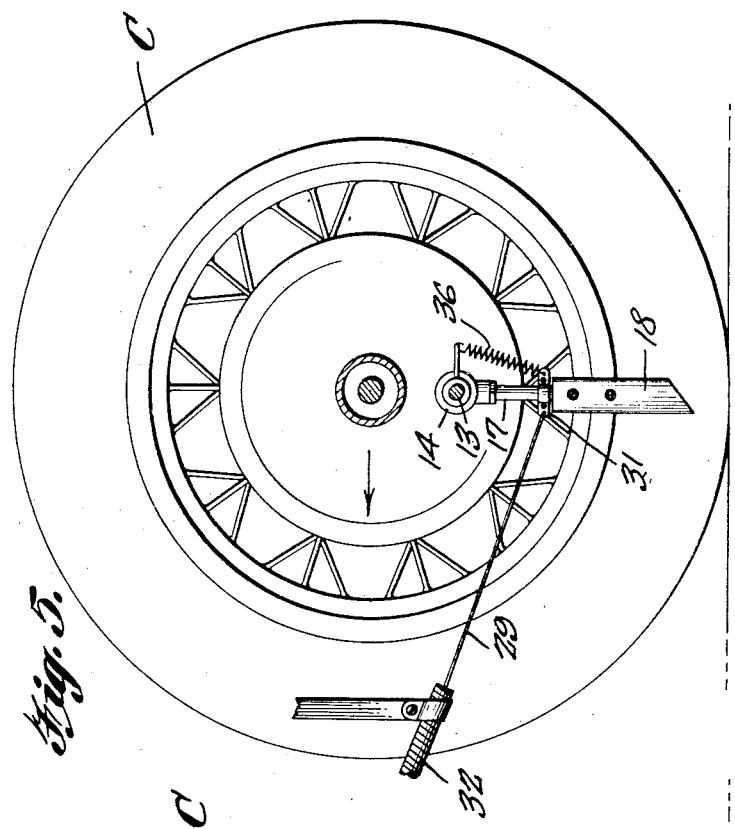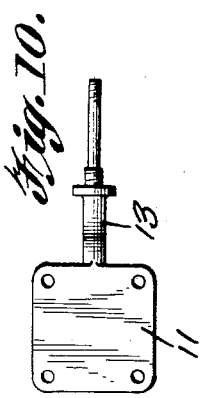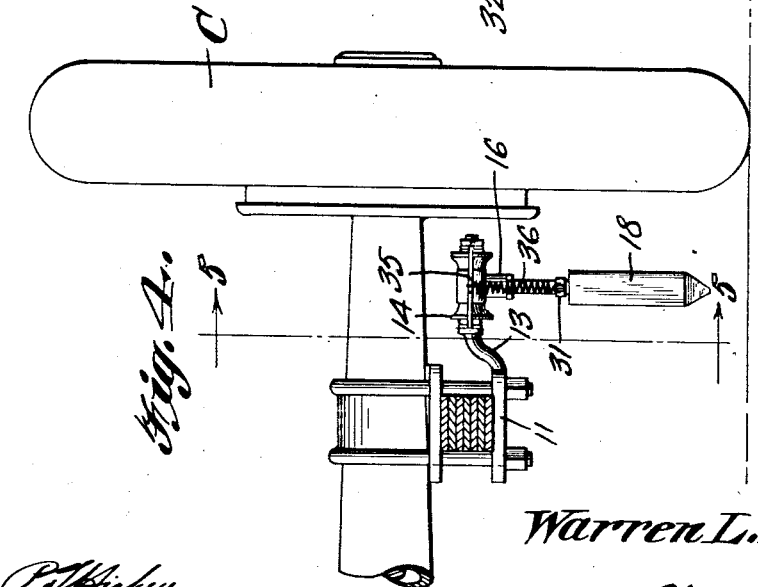

Feb. 7, 1933. W. L. HIGLEY 1,896,955
SWITCH
Filed July 28, 1931   5 Sheets-Sheet 4
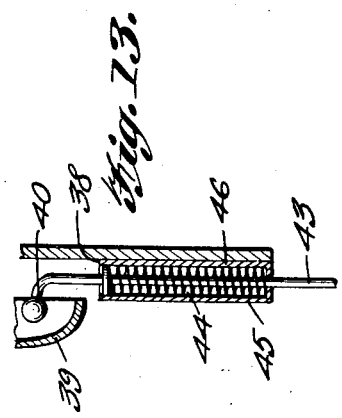
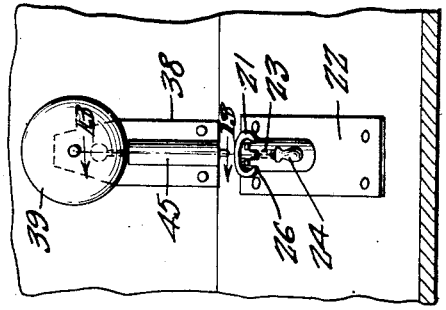
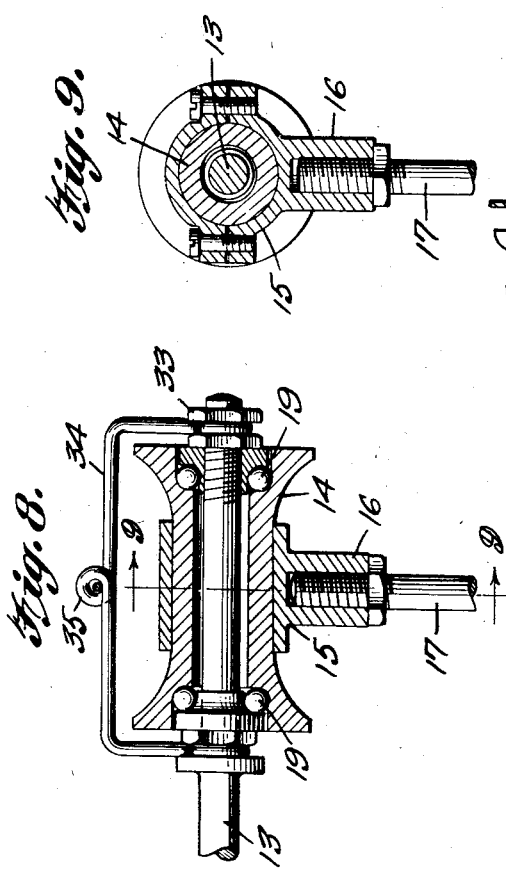
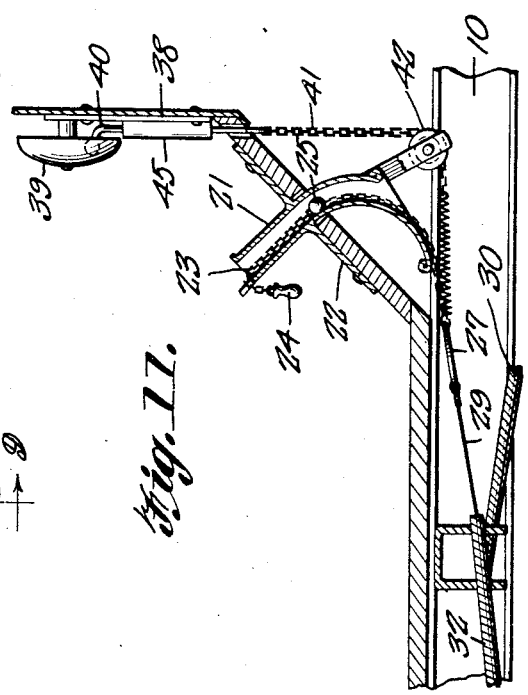
Warren L. Higley, INVENTOR
BY Victor J. Evans and Co. ATTORNEYS

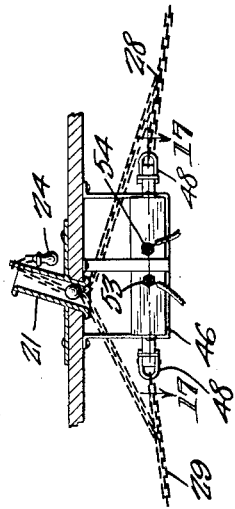
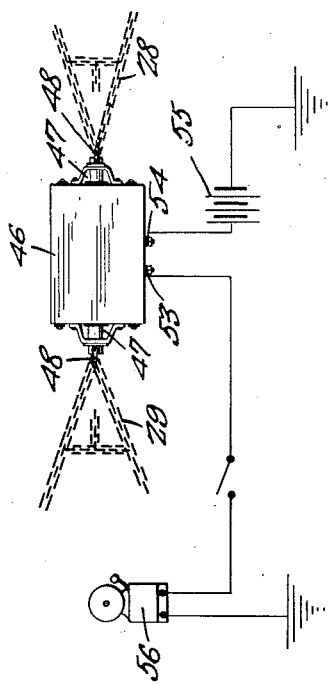
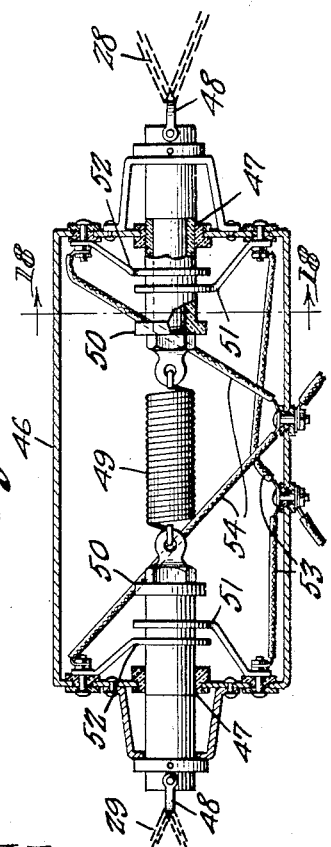

Patented Feb. 7, 1933

1,896,955

UNITED STATES PATENT OFFICE

WARREN LELAND HIGLEY, OF SHAWNEE, OKLAHOMA

SWITCH

Application filed July 28, 1931. Serial No. 553,673.

The invention relates to a deflation indicator and more particularly to the class of automobile tire deflation indicators or annunciators.

The primary object of the invention is the provision of a mechanism of this character wherein should any one of the tires upon an automobile become punctured or deflated or in any fashion fall below the standard pressure the operator of the automobile will instantly have knowledge thereof as the fact will be indicated either by a visible or audible signaling means, the latter being located convenient to the operator and also the mechanism of the indicator will be under the manual control of such operator so that when the automobile is traveling over uneven surfaces or a roadbed, there will be no liability of damage to any of the parts of such mechanism, as the same can be adjusted to prevent damage thereto.

Another object of the invention is the provision of an indicator of this character, wherein the mounting thereof is novel in form and in the construction is adaptable for varying makes of automobiles and its operation will be automatic for indicating tire deflation.

A further object of the invention is the provision of an indicator of this character wherein the operation of one portion thereof assigned to one wheel will not interfere or disturb the portions common to the other wheels of the vehicle, so that in the operation should any one of the tires or all of the same become punctured or deflated the indicator will successfully operate so that an operator will instantly know the fact.

A still further object of the invention is the provision of an indicator of this character which is extremely simple in its construction, assembly, thoroughly reliable and efficient in its operation, strong, durable, when applied will not detract from the appearance of the automobile, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a plan view of an automobile chassis showing the tired wheels and the indicator applied thereto.

Figure 2 is an enlarged fragmentary cross sectional view showing one of the tired wheels in elevation and the portion of the indicator assigned thereto.

Figure 3 is a sectional view on the line 3—3 of Figure 2 looking in the direction of the arrows.

Figure 4 is a view similar to Figure 2 showing the rear wheel of the automobile, while Figure 2 shows the front wheel thereof.

Figure 5 is a sectional view on the line 5—5 of Figure 4 looking in the direction of the arrows.

Figure 6 is a sectional view on the line 6—6 of Figure 2 looking in the direction of the arrows.

Figure 7 is a sectional view on the line 7—7 of Figure 3 looking in the direction of the arrows.

Figure 8 is a detail fragmentary sectional view through the hanger for one of the actuater arms or ground striking members.

Figure 9 is a sectional view on the line 9—9 of Figure 8 looking in the direction of the arrows.

Figure 10 is a detail plan view of one of the hangers.

Figure 11 is a fragmentary vertical sectional view showing the alarm and hand controlled means of the indicator.

Figure 12 is a front elevation thereof.

Figure 13 is a sectional view on the line 13—13 of Figure 12 looking in the direction of the arrows.

Figure 14 is a sectional view on the line 14—14 of Figure 1.

Figure 15 is a fragmentary elevation of an electric switch box showing diagrammatically the electric circuit and alarm in association therewith for use with the indicator.

Figure 16 is a vertical sectional view thereof.

Figure 17 is an enlarged sectional view on the line 17—17 of Figure 16.

Figure 18 is a sectional view on the line 18—18 of Figure 17 looking in the direction of the arrows.

Figure 19 is a sectional view on the line 19—19 of Figure 1 looking in the direction of the arrows.

Similar reference characters indicate corresponding parts throughout the several views in the drawings.

Referring to the drawings in detail, A designates generally the chassis of an automobile and includes the longitudinal channeled side sills 10, B the tired front wheels and C the tired rear wheels, these being standard and carried by the chassis A is the tire deflation indicator constituting the present invention and hereinafter more fully described.

The tire deflation indicator comprises a series of hangers, one for each tired wheel and each includes a plate 11 mountable in position by the spring clips 12 so as to be located inwardly of the wheel to which the same is adapted and this plate has an axle spindle 13 on which is journaled a hub 14 about which is engaged and made secure thereto a strap fitting 15 having a socketed boss 16 in which is adjustably threaded the stem 17 of an actuator arm or ground striking member 18, the latter being rigidly carried by the stem 17 which is engaged in the boss 16 having its strap fitting 15 made secure to the hub 14, the hub being adaptable for free rotation on the axle spindle 13. This hub is fitted with bearing balls 19, the arm or member 18 is normally disposed vertically and is spaced inwardly from the inner side of the wheel adjacent thereto for a purpose presently described.

Mounted on the floor board 20 at an intermediate location between the ends of the chassis A is a guide throat 21 having a base plate 22 suitably secured to said board 20 in position convenient to the operator of the automobile and trained through this throat 21 is a pull chain 23 having at its free end a handle 24, while spaced inwardly from the latter is a ball-like latch 25, the latter being adapted to engage in a notched keeper 26 and this chain 23 is connected at its other end with a ring 27 common to and connected to the cables 28 and 29 respectively. The cables 28 are trained through guide tubes 30 forwardly and are attached to clips 31 fixed to the stems 17 of the forward pair of arms or members 18, while the pull cables 29 are trained through guide tubes 32 and directed rearwardly where the same are connected by the clips 31 to the stems 17 of the rear pair of arms or members 18.

Securely fastened by nuts 33 to each axle spindle 13 is a bail 34 having a center eye 35 with which is connected a tensioning spring 36, the same being also connected with the clip 31 and this bail 34 is disposed horizontally while the spring 36 serves to urge the arm or member 18 in a vertical position and depending from the hanger as is shown in Figures 2 to 5 inclusive of the drawings which is the working position thereof.

The tubes 30 and 32 are engaged at their ends in brackets 37, these being made fast to the side sills 10 of the chassis A as clearly shown in Figure 1 of the drawings.

Mounted on the vertical portion 38 of the board 20 is an audible signal, in this instance a bell 39, the striker 40 of which is connected by a branch chain 41 trained over a pulley 42 with the chain 23 or the ring 27, the stem 43 of the striker 40 being tensioned by a spring 44 in a housing 45 upon the base 46 of the bell 39. When any one or all of the arms or members 18 engage with the ground or road surface resultant from deflation of any one or all of the tires on the wheels B and C the forward movement of the automobile will cause the arm or arms or member or members 18 to be swung rearwardly reversely to the direction of movement of the automobile and thus pull upon the cables 28 and 29 and through the chain 41 the striker 40 of the bell 39 will sound the latter, thereby signaling the fact that a tire has become deflated. Now when the automobile is traveling under normal conditions and upon a road surface irregular at the bed thereof the operator of the automobile can pull upon the handle 24 drawing the chain 23 outwardly through the throat 21 to bring the catch or latch 25 into engagement with the keeper 26 and thus the arms or members 18 will be lifted the required height against the tension of the spring 26 on each of the same so as to clear such irregularity in the roadbed and thereby prevent damage or liability of the same to the indicator mechanism.

When the chain 23 is unlatched by disengaging the catch or latch 25 from the keeper 26 each spring 36 will become active to return the arms or members 18 to vertical depending position as shown in Figures 2 to 5 of the drawings which is the normal working position thereof.

In Figures 15 to 18 of the drawings there is shown what might be termed a modification, wherein there is provided a switch box 46 having slidably fitted in opposite ends plungers 47, these at their outer ends carrying eyes 48 loosely engaged with the cables 28 and 29 and this box 46 is suitably mounted to the under face of the board 20. Each plunger 47 is insulated from the box 46 and are arranged opposite each other with a tensioning spring 49 interposed thereto and connected therewith so as to normally hold the plungers 47 drawn inwardly of the box 46. These plungers at their inner ends are formed with heads 50 arranged in the path of a pair of normally separated contacts 51 and 52 respectively having connected therewith the current wires 53 and 54 of a normally open electric circuit including the battery 55 and the audible signal, in this instance a bell 56. When a tire or tires on the wheels B and C become deflated and the arms 18 by contact with the ground or roadbed are swung reversely to the direction of travel of the automobile the plungers 47 will be moved outwardly of the switch box 46 against the resistance of the spring 49 and their heads 50 will act upon the contacts 51 and 52 bringing the same together, one in contact with the other and thus in this manner the electric circuit will be closed and thereby the bell 56 sounded signifying to the operator of the automobile that a tire or tires has become deflated.

With reference to Figure 19 the tube 30 carrying the cable 28 is loosely suspended and hung from a bracket 57 made fast to the side sills 10 of the chassis A and projected laterally therefrom, the bracket being formed with an upwardly and inwardly turned hook terminal 58 which prevents the tube from working loose from said bracket and thus in the turning of the front wheels B the tube 30 is free to move inwardly to clear the path for the turning movement of said wheels.

It is of course understood that in lieu of the bell 56 shown in the drawings any other type of electric audible signal may be employed.

Likewise it is contemplated should the necessity arise to substitute for the striker 40 and the bell 39 any other form or type of indicator means susceptible of proper operation.

What is claimed is:—

A switch for an indicator of the character described, comprising a housing, resilient normally separated contacts disposed within the housing at opposite ends thereof and each arranged in an electric circuit and having ring-like portions, plungers movable through the ring-like portions of said contacts and slidably fitted in opposite ends of the housing, heads on said plungers and working against the ring-like portions of the contacts to bring the same together for the closing of said circuit, a coiled retractile spring coupling the plungers together, and mechanically operated means for action upon the plungers to move the same against the resistance of the spring.

In testimony whereof I affix my signature.

WARREN LELAND HIGLEY.